United States Patent Office 3,592,595
Patented July 13, 1971

3,592,595
STABILIZATION AND CARBONIZATION OF ACRYLIC FIBROUS MATERIAL
Klaus H. Gump, Gillette, and Dagobert E. Stuetz, Westfield, N.J., assignors to Celanese Corporation, New York, N.Y.
No Drawing. Filed Nov. 21, 1968, Ser. No. 777,901
Int. Cl. C01b 31/07
U.S. Cl. 23—209.1                                      22 Claims

ABSTRACT OF THE DISCLOSURE

An improved process is provided for the stabilization of an acrylic fibrous material consisting primarily of recurring acrylonitrile units. The fibrous material is subjected to a stabilization treatment in which the starting material is heated while immersed in a solution of a Lewis acid capable of promoting the cyclization of pendant nitrile groups, e.g. a solution of stannic chloride. The exotherm normally exhibited by the precursor upon exposure to heat may be substantially reduced or totally eliminated in an efficient manner by such treatment which is believed to result in a product of improved chemical structure. The resulting product may be directly carbonized or carbonized and graphitized in an inert atmosphere or alternatively next subjected to relatively mild preoxidation conditions prior to treatment in an inert atmosphere. The carbonized or carbonized and graphitized fibrous materials exhibit improved physical properties.

BACKGROUND OF INVENTION

In the past procedures have been proposed for the conversion of fibers formed from acrylic polymers to a modified form possessing enhanced thermal stability. Such modification has generally been accomplished by heating the fibrous material in an oxygen-containing atmosphere, such as ordinary air, at moderate temperatures for extended periods of time. The resulting product may be suitable for use as an intermediate in the formation of carbonized fibrous materials, or for direct utilization as a fire resistant fiber. U.S. Pats. Nos. 2,913,802 to Barnett and 3,285,696 to Tsunoda disclose processes for the conversion of fibers of acrylonitrile homopolymers or copolymers to a heat resistant form. Such prior art stabilization techniques have commonly been directed to batch operations employing acrylonitrile copolymers. Belgian Pat. No. 700,655 discloses a procedure whereby a continuous length of an acrylonitrile copolymer may be continuously subjected to a preoxidation treatment to produce essentially complete oxygen saturation while maintained in air at a temperature not exceeding 250° C., e.g. three hours or more at 220° C. Belgian Pat. No. 678,679 and French Pat. No. 1,471,993 disclose conducting the complete stabilization process in an inert atmosphere. U.S. Pat. No. 3,242,000 to Lynch discloses a carbonization process in which an acrylic fiber is sprayed or padded with a solution of a compound having a refractory metal cation, and carbonized at 300° C. to 3000° C. in an atmosphere containing at least some oxygen thereby converting the compound to an inert oxide which serves as a barrier coating.

The stabilization of fibers of acrylonitrile homopolymers and copolymers in an oxygen-containing atmosphere involves (1) an oxidative cross-linking reaction of adjoining molecules as well as (2) a cyclization reaction of pendant nitrile groups to a condensed dihydropyridine structure. While the reaction rechanism is complex and not readily explainable, it is believed that these two reactions occur concurrently according to the prior art, or are to some extent competing reactions.

The cyclization reaction is exothermic in nature and must be controlled if the fibrous configuration of the acrylic polymer undergoing stabilization is to be preserved. As indicated, prior art techniques have commonly overcome this difficulty by heating the fiber in an oxygen containing atmosphere at moderate temperatures generally extended over many hours.

It is an object of the invention to provide an improved process for the stabilization of an acrylic fibrous material involving chemical catalysis of the cyclization reaction.

It is an object of the invention to provide an improved process for the flame-proofing of fibrous materials formed from acrylic polymers.

It is an object of the invention to provide an improved process for the stabilization of fibrous materials formed from acrylic polymers.

It is an object of the invention to provide non-burning stabilized acrylic fibrous materials which exhibit an enhanced molecular structure.

It is an object of the invention to provide a carbonized or carbonized and graphitized fibrous material possessing superior durability, strength, and stiffness which is derived from an acrylic polymer.

It is an object of the invention to provide a fiber which retains desirable textile properties when used at elevated temperatures, e.g. strength, ductility, stiffness, and abrasion resistance at temperatures as high as 500° C.

It is another object of the invention to provide an improved stabilization process for fibrous materials formed from acrylic polymers which results in a product which is suitable for carbonization, or carbonization and graphitization.

It is another object of the invention to provide a process for the stabilization of a fibrous material formed from an acrylic polymer which in at least some of its embodiments may be conducted on a highly expeditious continuous basis.

It is a further object of the invention to provide a process for the efficient conversion of acrylic fibrous materials to a non-burning form which effectively overcomes the difficulty normally presented by the critical exotherm upon the subjection of such starting materials to heat.

It is a further object of the invention to provide a process for converting a fibrous acrylic material to a stabilized form possessing essentially the identical fibrous configuration as the starting material.

These and other objects, as well as the scope, nature and utilization of the invention will be apparent from the following detailed description and appended claims.

SUMMARY OF INVENTION

It has been found that a process for the stabilization of an acrylic fibrous material comprises heating a fibrous material consisting primarily of recurring acrylonitrile units by immersion in a solution of a Lewis acid capable of promoting the cyclization of pendant nitrile groups maintained at about 160° C. to 260° C. until a stabilized fibrous product capable of undergoing carbonization is formed which retains its original fibrous configuration essentially intact and which is non-burning when subjected to an ordinary match flame. The stabilized product may be optionally carbonized or carbonized and graphitized by heating in an inert atmosphere. Alternatively, the starting material may be stabilized by heating while immersed in a solution of a Lewis acid until substantial cyclization occurs, and then heated in an oxygen-containing atmosphere under moderate conditions.

DETAILED DESCRIPTION OF THE INVENTION

It has been observed that the oxidative cross-linking and the cyclization reactions referred to above which simultaneously occur in the prior art when stabilization is conducted in an oxygen-containing atmosphere commonly may result in an undesirable fragmentation of the polymer chains. It has now been established that a stabilized acrylic material particularly suited for carbonization or carbonization and graphitization may be produced in accordance with the present invention. The cyclization reaction which occurs in the present process is catalytically promoted by certain Lewis acids discussed in detail hereafter. Also, the rate of oxidation is advantageously increased should the cyclization reaction be followed by an oxidative cross-linking reaction at moderate temperatures.

The acrylic fibrous material which is utilized as the starting material is formed either (1) entirely of recurring acrylonitrile units, or (2) of recurring acrylonitrile units copolymerized with a minor proportion of one or more monovinyl units to produce a copolymer exhibiting properties substantially similar to an acrylonitrile homopolymer. Acrylonitrile homopolymers are particularly preferred for use in the present process. Suitable copolymer materials commonly contain at least 85 mol percent of recurring acrylonitrile units and up to about 15 mol percent of one or more monovinyl units copolymerized therewith. The preferred acrylonitrile copolymers contain at least about 95 mol percent of acrylonitrile units and up to about 5 mol percent of one or more monovinyl units copolymerized therewith. Suitable monovinyl units include styrene, methyl acrylate, methyl methacrylate, vinyl acetate, vinyl chloride, vinylidene chloride, vinyl pyridine, and the like, or a plurality of such monomers.

The acrylic fibrous materials which are stabilized in accordance with the present invention may be present in any one of a variety of configurations. For instance, the fibrous materials may be present in the form of continuous single filaments, continuous multifilament yarns, staple fibers, tows, ropes, tapes, knits, braids, fabrics, or other fibrous assemblages. In a preferred embodiment of the invention the fibrous material is present in a continuous length, e.g. a single continuous filament, a yarn, or a tape. In a particularly preferred embodiment of the invention the acrylic fibrous material is in the form of a continuous multifilament yarn. Such a yarn may be formed by conventional techniques which are well known to those skilled in the art. For instance, dry spinning or wet spinning techniques may be employed. The yarn which serves as the starting material in the process may optionally be provided with a twist which improves its handling characteristics. For example, a twist of about 0.1 to 3 t.p.i., and preferably about 0.1 to 1.0 t.p.i. may be utilized. Larger yarn bundles or other fibrous assemblages may generally be formed by plying (1) prior to the stabilzation treatment, (2) between the stabilization stages of the process when an oxidative treatment follows the Lewis acid treatment, or (3) immediately subsequent to the stabilization treatment.

The acrylic fibrous material which serves as the starting material may be highly oriented. For instance, the starting material may be highly oriented by hot drawing to a relatively high single filament tensile strength of at least about 5 grams per denier prior to stabilization.

The cyclization reaction involving pendant nitrile groups which occurs upon exposure of the acrylic fibrous material to heat is exothermic regardless of the nature of the reaction medium and if uncontrolled may result in the destruction of the fibrous configuration of the starting material. In some instances this exothermic reaction will occur with explosive violence. More commonly, however, the fibrous material will simply rupture, disintegrate and/or coalesce when the "critical temperature" is reached. As the quantity of comonomer present in an acrylonitrile copolymer is increased, a fibrous material consisting of the same tends to soften at a progressively lower temperature and the possible destruction of the original fibrous configuration through coalescence of adjoining fibers becomes a factor of increasing importance. Such softening is generally accompanied by a marked reduction in strength which may in severe instances lead to the destruction of the original fibrous configuration through breakage brought about by the inability of the fibrous material to support its own weight. Also, fibrous materials which are highly oriented tend to exhibit a higher "critical temperature" than the corresponding materials which lack such orientation. The "critical temperature" referred to herein is defined as the temperature at which the fibrous configuration of a given sample of acrylic fibrous starting material will be destroyed in the absence of prior stabilization.

In a preferred embodiment of the invention the starting material exhibits a crittical temperature of at least about 300° C., e.g. about 300° C. to 330° C. In addition to visual observation, the detection of the critical temperature of a given acrylic material may be aided in some instances by the use of thermoanalytical methods, such as differential scanning calorimeter techniques, whereby the location and magnitude of the exothermic reaction can be measured quantitatively.

If the cyclization reaction is begun in the absence of an adequate provision for heat dissipation, the critical temperature may be rapidly approached or even exceeded with the concomitant destruction of the product. It accordingly follows that if one chooses to stabilize a package of yarn in accordance with the present invention where heat dissipation is possibly impaired within the interior thereof, and where portions of the fibrous material are in contact, the initial heat applied to the same must be relatively moderate so that the exothermic heat of reaction generated within the package as the cyclization reaction progresses does not exceed the threshold temperature for any portion of the package.

For best results uniform heat treatment throughout all portions of the fibrous acrylic material during the stabilization treatment is encouraged. Such uniform reaction conditions can best be accomplished by limiting the mass of fibrous material at any one location so that heat dissipation from within the interior of the material is not unduly impaired. For instance, the fibrous material undergoing treatment may be immersed in a Lewis acid solution with generally free access to an appreciable portion of its surface area being provided and the corresponding efficient heat transfer promoted. In a preferred embodiment of the invention a continuous length of the acrylic starting material, such as a yarn, is continuously passed through a suitable Lewis acid solution while suspended in the same. Also, the fibrous material may be present as windings on a support during the stabilization treatment provided the exothermic heat of reaction is effectively dissipated and adequate contact is made between the material and the Lewis acid solution.

Initially the acrylic fibrous material is heated while immersed in a solution of a Lewis acid capable of promoting the cyclization of pendant nitrile groups maintained at a temperature of about 160° C. to 260° C. In a preferred embodiment of the invention the Lewis acid solution is maintained at a temperature of about 180° C. to 225° C.

Suitable Lewis acids include stannous chloride ($SnCl_2$), stannic chloride ($SnCl_4$), boron fluoride ($BF_3$), sulfur trioxide ($SO_3$), ferric chloride ($FeCl_3$), titanium tetrachloride ($TiCl_4$), aluminum chloride ($AlCl_3$), and indium dichloride ($InCl_2$). The preferred Lewis acid for use in the present invention is stannic chloride. Lewis acids are selected which are incapable of dissolving, decomposing, or otherwise destroying the fibrous configuration of the acrylic fibrous material immersed therein. The high present cost of indium dichloride militates against its selection.

In a preferred embodiment of the invention the Lewis acid is present in the form of a complex formed with nucleophilic reagents such as ethers, amides, or tertiary amines. These complexes tend to be hydrolytically and thermally more stable than the parent Lewis acids and offer significant handling advantages particularly when the Lewis acid is normally a gas or liquid. The particularly preferred complex forming base is N,N'-dimethylformamide. Suitable complexes may be formed by dissolving the Lewis acid in a solvent, e.g. dry chloroform, and incrementally adding an excess of the complex forming base with stirring. A complex forms as a precipitate which may be isolated by filtration, washed, and dried. The ratio of Lewis acid to base in the complex is dependent upon the stoichiometric composition of the acid-base complex. For instance, $BF_3$ forms a 1:1 complex with ethers. The particularly preferred complex contains one mol stannic chloride per two mols of N,N'-dimethylformamide.

The Lewis acid solution which is utilized in the stabilization process of the invention is formed by dissolving the acid, whether it be in an uncombined or in a complex form, in a solvent which is capable of dissolving the same. It is essential that the acrylic fibrous material be insoluble in the solvent selected. Solvents may be employed which have a boiling point within the range of 160° C. to 260° C. so that the acrylic fibrous material may conveniently be treated while the solvent is under reflux with self adjustment of temperature. The preferred solvents are nitrobenzene, nitrotoluene and diphenyl ether. The solvent must be essentially anhydrous to avoid gradual deactivation of the Lewis acid catalyst by hydrolysis. It is, therefore, preferred to dry the solvent by running it through a bed of drying agent (e.g. Linde sieves, activated alumina, etc.), and to exclude atmospheric moisture pick-up by blanketing with dry air or nitrogen. The Lewis acid is preferably dissolved in the solvent in a concentration of about 0.1 to 10 percent by weight. When the Lewis acid is present in a complex, the calculation is based upon the molecular weight of the free Lewis acid. In a particularly preferred embodiment of the invention the solution contains about one to about 5 percent of the Lewis acid by weight, e.g. about one percent Lewis acid by weight.

The length of time during which the acrylic fibrous material is heated by immersion in a solution of a Lewis acid is inversely related, but not necessarily proportional, to the temperature of the solution. For instance, if the treatment is conducted at a temperature of about 160° C. to 260° C., heating times commonly range from about 24 hours to 30 minutes. At the completion of such treatment no appreciable exothermic or endothermic reactions may be detected in the fibrous material by differential scanning calorimeter techniques upon heating to about 500° C. The stabilized material is capable of undergoing carbonization or carbonization and graphitization, is black in appearance, is non-burning when subjected to an ordinary match flame, and retains its initial fibrous configuration essentially intact.

Infrared analyses indicate that the stabilized product contains only a very small residual amount of the pendant —C≡N groups of the starting material which appear at 4.47μ. Instead —C=N— groups are detected at 6.3μ. Analyses of samples taken at various reaction times indicate a decrease of —C≡N groups, and a corresponding increase of —C=N— groups confirming that the major reaction is one of cyclization. The cyclized product of the invention is insoluble in the usual spinning solvents, such as N,N'-dimethylacetamide or N,N'-dimethylformamide.

The bound oxygen content of the fibrous material stabilized exclusively by immersion in the heated Lewis acid solution is no more than about 5 percent by weight, and commonly no more than about 2 percent by weight. The weight percentage of bound oxygen present in the material may be determined by routine analytical techniques such as the Unterzaucher analysis. The presence of any bound oxygen is deemed to be an extraneous phenomenon likely resulting from bound oxygen present in the original starting material, or from oxygen taken up as the fibrous material enters or leaves the treatment zone.

Immediately following the removal of the fibrous material from the Lewis acid solution it may be conveniently washed by conventional techniques, such as by extraction in a Soxhlet extractor with low boiling solvents, e.g. methylene chloride, chloroform, carbon tetrachloride, acetone, etc., or by passing the fibrous material through a bath containing these solvents, and then drying in an air stream or by heating in an enclosed chamber supplied with hot air.

In a further embodiment of the invention the acrylic fibrous material is heated by immersion in a solution of a Lewis acid capable of promoting the cyclization of pendant nitrile groups maintained at about 160° C. to 260° C. until substantial cyclization of pendant nitrile groups present within the same occurs to form a cyclized product, and the cyclized product is heated in an oxygen-containing atmosphere under relatively mild preoxidation conditions until a stabilized fibrous product capable of undergoing carbonization is formed which retains its fibrous configuration essentially intact and which is non-burning when subjected to an ordinary match flame. The oxygen-containing atmosphere commonly contains an appreciable quantity of oxygen, e.g. about 5 to 75 percent oxygen by weight. Air may conveniently be used as the oxygen-containing atmosphere. The temperature of the oxygen-containing atmosphere may be maintained at about 200° C. to 400° C. (preferably about 250° C. to 350° C.).

It is preferred that no signficant exotherm be exhibited by the cyclized product prior to its subjection to the oxygen-containing atmosphere. However, it is not essential that the exotherm be completely eliminated provided substantial cyclization has occurred as evidenced by a change in the appearance of the material from white to dark brown or black.

The time required to complete the preoxidation treatment in an oxygen-containing atmosphere is inversely related, but not necessarily proportional, to the temperature to which the cyclized product is subjected. For instance, if the temperature of the oxygen-containing atmosphere is about 200° C. to 400° C., heating times commonly range from about 30 minutes to 10 minutes. The duration of the exposure of the cyclized product to an oxygen-containing atmosphere is also influenced in some degree to the concentration of oxygen present within the atmosphere.

At the completion of the preoxidation treatment the stabilized fibrous material is lustrous black in appearance. A total bound oxygen content of at least about 7 percent by weight is preferably achieved during the optional preoxidation step of the process. A bound oxygen content of 7 to 15 percent by weight is commonly produced. Higher oxygen contents tend to require extended residence times, and generally yield no commensurate advantage.

The stabilization treatment of the present invention yields a stabilized fibrous material which may be carbonized or carbonized and graphitized in an inert atmosphere. Carbonization temperatures ranging from about 900° C. to 3000° C. may be employed for about 3 seconds to about 5 minutes. The carbonization step may generally follow immediately after either of the stabilization embodiments previously described without the necessity to use an intermediate heating schedule. During the carbonization reaction elements present in the stabilized fibrous material other than carbon, e.g. nitrogen, hydrogen and oxygen, are expelled. The term "carbonized product" as used herein is defined to be a product consisting of at least about 90 percent carbon by weight, and preferably at least about 95 percent carbon by weight. Graphitic carbon may or may not be present in the same. Suitable inert or nonoxidizing atmospheres in which the carbonization step may be conducted include nitrogen, argon, helium, etc.

A carbonized product including substantial amounts of graphitic carbon results if the temperature is more severe, e.g. about 2000° C. to about 3000° C. A graphitized product may generally be formed in about 5 seconds to about 2 minutes. The presence of graphitic carbon may be detected by the characteristic X-ray diffraction pattern of graphite. In a particularly preferred embodiment of the invention a graphitized product is formed by heating the carbonized fibrous material at a temperature of about 2900° C. for at least about 5 seconds, e.g. about 5 to 60 seconds. By varying the temperature the properties of the resulting product may be varied. For instance, the modulus of the carbonized product tends to increase with increasing temperatures, while the tensile strength tends to remain constant for all temperatures above about 1400° C. provided the fiber is not damaged by handling or thermal shock.

The equipment utilized to carry out the process of the invention may be varied widely as will be apparent to those skilled in the art. For instance, during the Lewis acid treatment a continuous length of the starting material may be immersed in a vessel containing a solution of the Lewis acid while wound on a suitable support or mandrel. Alternatively, a continuous length of the acrylic fibrous material may be continuously passed through a vessel containing the Lewis acid solution. Likewise, the optional preoxidation step of the process may be conducted on either a batch or a continuous basis. During the preoxidation treatment the cyclized product may be placed in or continuously passed through a circulating oven, or the tube of a muffle furnace while in contact with an oxygen-containing atmosphere. In a continuous operation a continuous length of the fibrous material may be optionally passed through the preoxidation zone for a plurality of passes until the desired residence time is achieved.

The carbonization or carbonization and graphitization treatment may be conducted in any apparatus capable of producing the required temperatures while excluding the presence of an oxidizing atmosphere. For instance, suitable apparatus include induction furnaces, tube furnaces in which a hollow graphite susceptor is heated by direct resistance heating, direct resistance heating apparatus in which electric current is passed through the fibrous material, apparatus capable of producing reducing flames, electric arc furnaces, thermal image equipment such as solar furnaces, low temperature plasma flames, lasers, etc. When an induction furnace is utilized, the stabilized fibrous material may be passed through a graphite tube or shroud which is situated within the windings of an induction coil.

The following examples are given as specific illustrations of the invention. It should be understood, however, that the invention is not limited to the specific details set forth in the examples.

EXAMPLE I

A continuous length of an 800 fil dry spun acrylonitrile homopolymer continuous filament yarn having a total denier of 1150 was selected for use as the starting material. The yarn was highly oriented and drawn to a single filament tenacity of 7.5 to 8.0 grams per denier, and exhibited a critical temperature of approximately 325° C.

Stannic chloride ($SnCl_4$) was dissolved in dry chloroform in a concentration of 0.4 mol per liter and cooled to 0° C. N,N'-dimethylformamide was added dropwise to the stannic cholride solution with stirring to a concentration of 1.2 mols of N,N'-dimethylformamide per liter of chloroform. A white precipitate of stannic chloride-dimethylformamide complex formed in which 2 mols of N,N'-dimethylformamide were combined with each mol of stannic chloride. The complex was isolated by filtration, washed three times with chloroform, and dried.

A one weight percent solution of the Lewis acid was formed using nitrobenzene as solvent and placed in a closed reaction vessel provided with a condenser and nitrogen inlet. The temperature of the solution was raised to 180° C. The continuous length of acrylonitrile homopolymer yarn was wound on a support and submerged in the solution. After four hours the yarn sample was found to exhibit only 23 percent of exotherm exhibited by an untreated sample as measured by differential scanning calorimeter techniques. The heating of the yarn was continued in the nitrobenzene solution for a total residence time of 18 hours.

The resulting stabilized yarn was washed by the sequential immersion of the same in chloroform and acetone for 10 minutes in each wash medium and dried. Upon testing by differential scanning calorimeter techniques the yarn exhibited essentially no residual exotherm and was capable of undergoing carbonization. It was observed that the stabilized yarn was black in appearance, retained its original fibrous configuration essentially intact, and was non-burning when subjected to an ordinary match flame. The stabilized yarn possessed a bound oxygen content of less than 5 percent by weight, and its cyclic structure was confirmed by infrared analysis.

The stabilized yarn was next continuously introduced and withdrawn from a Lepel 450 kc. induction furnace in order to carbonize and graphitize the same where it was heated to a maximum temperature of approximately 2900° C. for a total residence time of 40 seconds. The induction furnace comprised a 10 turn water cooled copper coil having an inner diameter of ¾ inch and a length of 2 inches, a 20 kw. power source, and was equipped with a hollow graphite tube suspended within the coil of the same having a length of 8½ inches, an outer diameter of ½ inch and an inner diameter of ⅛ inch through which the previously stabilized yarn was continuously passed. The copper coil which encompassed a portion of the hollow graphite tube was positioned at a location essentially equidistant from the respective ends of the graphite tube. An inert atmosphere of nitrogen was maintained within the induction furnace. The graphitized product was composed of essentially pure carbon, and exhibited a single filament tenacity of 9 grams per denier ($221 \times 10^3$ p.s.i.), and a single filament modulus of 2000 grams per denier ($50 \times 10^6$ p.s.i.).

In a control procedure a like sample of acrylonitrile homopolymer yarn was heated in nitrobenzene as described in Example I in the absence of the stannic chloride-dimethylformamide complex. After 18 hours the yarn was light brown in appearance, and no change in its exotherm was found to have resulted from the treatment. The yarn was accordingly incapable of undergoing carbonization.

EXAMPLE II

Example I was repeated with the exception that stannic chloric was dissolved in the nitrobenzene solvent instead of the stannic chloride-dimethylformamide complex. Substantially similar results were achieved.

EXAMPLE III

Example I was repeated with the exception that aluminum chloride was dissolved in the nitrobenzene solvent instead of the stannic chloride-dimethylformamide complex. Substantially similar results were obtained.

EXAMPLE IV

Example I was repeated with the following modifications. The stannic chloride-dimethylformamide complex was dissolved in diphenyl ether instead of nitrobenzene and the temperature of the solution during the stabilization treatment was 225° C. After one-half hour of such treatment the yarn exhibited essentially no residual exotherm and was carbonized and graphitized following washing. A substantially similar product was obtained.

EXAMPLE V

A yarn sample identical to that employed in Example I was selected. The yarn was immersed in a 1 percent by weight solution of stannic chloride-dimethylformamide complex in nitrobenzene identical to that employed in Example I for one hour at 180° C. The resulting cyclized product was dark brown in appearance and exhibited approximately 25 percent of the exotherm exhibited by an untreated sample.

After washing and drying in accordance with the procedure of Example I, a Lindberg muffle furnace having a tube diameter of 1¼ inches and a length of 52 inches was utilized to carry out a preoxidation treatment in an air atmosphere. The yarn was continuously passed over rollers situated at each end of the furnace and suspended along the axial center of the tube furnace for a total residence time of 27 minutes at 285° C. The resulting stabilized product was black in appearance, retained its original fibrous configuration essentially intact, and was non-burning when subjected to an ordinary match flame.

Following carbonization and graphitization pursuant to the procedure of Example I, the graphitized product was composed of essentially pure carbon, and exhibited a single filament tenacity of 15.6 grams per denier ($390 \times 10^3$ p.s.i.), and a single filament modulus of 3400 grams per denier ($85 \times 10^6$ p.s.i.).

EXAMPLE VI

Example V was repeated with the following modifications. The acrylonitrile homopolymer yarn of Example 1 was immersed in a 1 percent solution of stannic chloride in diphenyl ether for 30 minutes at 225° C. After washing and drying in accordance with the procedure of Example I, the cyclized yarn exhibited essentially no residual exotherm. The resulting yarn was next continuously preoxidized by passage through the muffle furnace described in Example V for a residence time of 15 minutes at 285° C. The resulting stabilized product was black in appearance, retained its original fibrous configuration essentially intact, and was non-burning when subjected to an ordinary match flame.

Following carbonization and graphitization persuant to the procedure of Example I, the graphitized product was composed of essentially pure carbon, and exhibited a single filament tenacity of 16.3 grams per denier ($406 \times 10^3$ p.s.i.), and a single filament modulus of 3300 grams per denier ($83 \times 10^6$ p.s.i.).

EXAMPLE VII

A yarn sample identical to that employed in Example I was selected. The yarn was immersed in a 1 percent by weight solution of stannic chloride-dimethylformamide complex in nitrobenzene identical to that employed in Example I for one hour at 180° C. The resulting cyclized product was dark brown in appearance and exhibited approximately 25 percent of exotherm exhibited by an untreated sample.

After washing and drying in accordance with the procedure of Example I, the cyclized yarn was wound on a bobbin to a depth of 0.25 inch and placed in an oven (temperature 285° C.) having an oxygen content of 55 percent by weight for 16 hours. The resulting stabilized product was black in appearance retained its original fibrous configuration essentially intact, was non-burning when subjected to an ordinary match flame, and possesses a bound oxygen content of 11.8 percent by weight.

Following carbonization and graphitization pursuant to the procedure of Example I, the graphitized product was composed of essentially pure carbon, and exhibited a single filament tenacity of 15.9 grams per denier ($397 \times 10^3$ p.s.i.), and a single filament modulus of 2600 grams per denier ($65 \times 10^6$ p.s.i.).

EXAMPLE VIII

A yarn sample identical to that employed in Example I was selected. The yarn was continuously passed for 30 minutes through a 1 percent by weight solution of a stannic chloride-dimethylformamide complex formed according to the procedure of Example I and dissolved in diphenyl ether. The solution was present in a closed reaction vessel provided with a condenser and nitrogen inlet, and was maintained at 225° C. The yarn was washed in methylene chloride and dried. The resulting yarn was black in appearance, free of exotherm, and essentially free of unreacted —C≡N groups. The cyclization reaction was confirmed by the increasing presence of —C=N— groups during the treatment as determined by infrared analysis.

The yarn was next heated in air at 285° C. by continuous passage through the Lindberg muffle furnace described in Example V for a total residence time of 15 minutes. The resulting yarn was black in appearance, retained its original fibrous configuration essentially intact, and was non-burning when subjected to an ordinary match flame.

The resulting yarn was carbonized and graphitized according to the procedure of Example I. The graphitized product was composed of essentially pure carbon, and exhibited a single filament tenacity of 17 grams per denier ($425 \times 10^3$ p.s.i.), and a single filament modulus of 3100 grams per denier ($78 \times 10^6$ p.s.i.).

The fibrous material resulting from the stabilization treatment of the present invention is suitable for use in applications where a fire resistant fibrous material is required. For instance, non-burning fabrics may be formed from the same. As previously indicated, the stabilized fibrous materials are particularly suited for use as intermediates in the production of fibrous graphite products. Such fibrous graphite products may be incorporated in a binder or matrix and serve as a reinforcing medium. The graphite component may accordingly serve as a lightweight load bearing component in high performance structures which find particular utility in the aerospace industry.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the stabilization of an acrylic fibrous material selected from the group consisting of an acrylonitrile homopolymer and acrylonitrile copolymers which contain at least about 85 mol percent of acrylonitrile units up to about 15 mol percent of one or more monovinyl units copolymerized therewith comprising heating said fibrous material by immersion in a non-aqueous solution of a Lewis acid capable of promoting the cyclization of pendant nitrile groups selected from the group consisting of stannous chloride, stannic chloride, boron fluoride, sulfur trioxide, ferric chloride titanium tetrachloride, aluminum chloride and indium dichloride maintained at about 160° C. to 260° C. until a stabilized fibrous product capable of undergoing carbonization is formed which retains its original fibrous configuration essentially intact and which is non-burning when subjected to an ordinary match flame.

2. A process according to claim 1 in which said acrylic fibrous material is an acrylonitrile homopolymer.

3. A process according to claim 1 in which said acrylic fibrous material is a yarn.

4. A process according to claim 1 in which said Lewis acid is stannic chloride.

5. A process according to claim 4 in which said Lewis acid is introduced to said non-aqueous solution in the form of a stannic chloride-dimethylformamide complex.

6. A process for the stabilization of an acrylic fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith comprising heating said fibrous material by immersion in a non-aqueous solution of a Lewis acid capable of promoting the cyclization of pendant nitrile groups selected from the group consisting of stannous chloride, stannic chloride, boron fluoride, sulfur trioxide, ferric chloride, titanium tetrachloride, aluminum chloride, and indium dichloride maintained at about 160° C. to 260° C. until substantial cyclization of pendant nitrile groups present within the same occurs to form a cyclized product, and heating said cyclized product in an oxygen-containing atmosphere at a temperature of about 200° C. to about 400° C. until a stabilized fibrous product capable of undergoing carbonization is formed which retains its original fibrous configuration essentially intact and which is non-burning when subjected to an ordinary match flame.

7. A process according to claim 6 in which said acrylic fibrous material is an acrylonitrile homopolymer.

8. A process according to claim 6 in which said acrylic fibrous material is a yarn.

9. A process according to claim 6 in which said Lewis acid is stannic chloride.

10. A process according to claim 9 in which said Lewis acid is introduced to said non-aqueous solution in the form of a stannic chloride-dimethylformamide complex.

11. A process for the carbonization of an acrylic fibrous material selected from the group consisting of an acrylonitrile homopolymer and acrylonitrile copolymers which contain at least about 85 mol percent acrylonitrile units and up to about 15 mol percent of one or more monovinyl units copolymerized therewith comprising heating said fibrous material by immersion in a non-aqueous solution of a Lewis acid capable of promoting the cyclization of pendant nitrile groups selected from the group consisting of stannous chloride, stannic chloride, boron fluoride, sulfur trioxide, ferric chloride, titanium tetrachloride, aluminum chloride, and indium dichloride maintained at about 160° C. to 260° C. until a stabilized fibrous product is formed which retains its original fibrous configuration essentially intact and which is non-burning when subjected to an ordinary match flame, and subsequently heating said stabilized fibrous product at a temperature of about 900° C. to 3000° C. in an inert atmosphere until a carbonized fibrous product is formed.

12. A process according to claim 11 in which said acrylic fibrous material is an acrylonitrile homopolymer.

13. A process according to claim 11 in which said acrylic fibrous material is a yarn.

14. A process according to claim 11 in which said Lewis acid is stannic chloride.

15. A process according to claim 14 in which said Lewis acid is introduced to said non-aqueous solution in the form of a stannic chloride-dimethylformamide complex.

16. A process according to claim 11 in which said stabilized fibrous product is heated to a maximum temperature of about 2000° C. to 3000° C. in an inert atmosphere where it is maintained until substantial graphitization has occurred.

17. A process for the carbonization of an acrylic fibrous material selected from the group consisting of an acrylonitrile homopolymer and acrylonitrile copolymers which contain at least about 85 mol percent acrylonitrile units and up to about 15 mol percent of one or more monovinyl units copolymerized therewith comprising heating said fibrous material consisting primarily of recurring acrylonitrile units by immersion in a non-aqueous solution of a Lewis acid capable of promoting the cyclization of pendant nitrile groups selected from the group consisting of stannous chloride, stannic chloride, boron fluoride, sulfur trioxide, ferric chloride, titanium tetrachloride, aluminum chloride, and indium dichloride maintained at about 160° C. to 260° C. until substantial cyclization of pendant nitrile groups present within the same occurs to form a cyclized product, heating said cyclized product in an oxygen-containing atmosphere at a temperature of about 200° C. to about 400° C. until a stabilized fibrous product is formed which retains its original fibrous configuration essentially intact and which is non-burning when subjected to an ordinary match flame, and subsequently heating said stabilized fibrous product at a temperature of about 900° C. to 3000° C. in an inert atmosphere until a carbonized fibrous product is formed.

18. A process according to claim 17 in which said acrylic fibrous material is an acrylonitrile homopolymer.

19. A process according to claim 17 in which said acrylic fibrous material is a yarn.

20. A process according to claim 17 in which said Lewis acid is stannic chloride.

21. A process according to claim 20 in which said Lewis acid is introduced to said non-aqueous solution in the form of a stannic chloride-dimethylformamide complex.

22. A process according to claim 17 in which said stabilized fibrous product is heated to a maximum temperature of about 2000° C. to 3000° C. in an inert atmosphere where it is maintained until substantial graphitization has occurred.

References Cited

UNITED STATES PATENTS

| | | | |
|---|---|---|---|
| 3,242,000 | 3/1966 | Lynch | 23—209.1X |
| 3,285,696 | 11/1966 | Tsunoda | 23—209.1 |
| 3,495,940 | 2/1970 | Stuetz | 23—209.1X |
| 3,497,318 | 2/1970 | Noss | 23—209.1 |

OTHER REFERENCES

Shindo "Osaka Kogyo Gijutsu Shinkeusho Hokoku," No. 317, 1961, pages 7–17.

EDWARD J. MEROS, Primary Examiner

U.S. Cl. X.R.

8—115.5; 23—209.4